(12) United States Patent
Ozeki et al.

(10) Patent No.: US 7,158,198 B2
(45) Date of Patent: Jan. 2, 2007

(54) TRANSFLECTIVE COLOR LIQUID CRYSTAL DISPLAY INCLUDING COLOR FILTERS ON TRANSPARENT RESISTS AND METHOD OF FABRICATING A SUBSTRATE THEREFOR

(75) Inventors: Masao Ozeki, Yokohama (JP); Ichiro Takasaki, Yokohama (JP); Haruki Mori, Amagasaki (JP)

(73) Assignee: Optrex Corporation, Tokyo (JP)

( * ) Notice: Subject to any disclaimer, the term of this patent is extended or adjusted under 35 U.S.C. 154(b) by 0 days.

(21) Appl. No.: 10/281,108

(22) Filed: Oct. 28, 2002

(65) Prior Publication Data

US 2003/0090610 A1    May 15, 2003

(30) Foreign Application Priority Data

Oct. 31, 2001  (JP)  .............................. 2001-335206

(51) Int. Cl.
  *G02F 1/1335*  (2006.01)
(52) U.S. Cl. .................. 349/114; 349/106; 349/113
(58) Field of Classification Search ............. 349/106, 349/113, 114
  See application file for complete search history.

(56) References Cited

U.S. PATENT DOCUMENTS 6,690,438 B1 *  2/2004  Sekiguchi ................. 349/114

| 2001/0017679 A1 | 8/2001 | Ha et al. ................. 349/113 |
| 2001/0019385 A1 | 9/2001 | Song et al. ............... 349/113 |
| 2001/0022634 A1 | 9/2001 | Chung et al. .............. 349/43 |
| 2003/0030055 A1 * | 2/2003 | Nakano et al. ........... 257/72 |
| 2003/0138574 A1 * | 7/2003 | Tanaka et al. ............ 428/1.6 |

FOREIGN PATENT DOCUMENTS

| EP | 0 576 303 | 12/1993 |
| JP | 6-11711 | 1/1994 |
| JP | 2000-298271 | 10/2000 |

OTHER PUBLICATIONS

Patent Abstracts of Japan, JP 11-052366, Feb. 26, 1999.

* cited by examiner

*Primary Examiner*—Tarifur R. Chowdhury
(74) *Attorney, Agent, or Firm*—Oblon, Spivak, McClelland, Maier & Neustadt, P.C.

(57) ABSTRACT

A transparent resist 13 having a certain thickness is provided on a full reflection film 11a at light reflection portions 11, and light reflection portions 12 are formed as holes having a certain depth, when one of the substrates 10 has an inner surface provided with the light reflection portions 11 made of the full reflection film 11a and the light transmission portions 12 formed as openings without the full reflection layer, and a color filter 14 is provided on each paired light reflection portion 11 and light transmission portion 12.

14 Claims, 3 Drawing Sheets

TRANSFLECTIVE COLOR LIQUID CRYSTAL DISPLAY INCLUDING COLOR FILTERS ON TRANSPARENT RESISTS AND METHOD OF FABRICATING A SUBSTRATE THEREFOR

The present invention relates to a transflective color liquid crystal display having light transmission portions and light reflection portions on an inner surface and a method for fabricating a substrate therefor, in particular, a technique capable of realizing good color purity and brightness on both light transmission and light reflection in that sort of liquid crystal display.

BACKGROUND OF THE INVENTION

A transflective color liquid crystal display is generally configured to have a semi-reflection layer as a thin layer made of, e.g., aluminum provided on one of the substrates and color filters provided on the semi-reflection layer or the other substrate.

There has been known a method wherein a full reflection layer is utilized in place of the semi-reflection layer, and that the full reflection layer has openings formed in some portions thereof. This method will be explained, referring to FIG. 3. A full reflection layer 2 is deposited on one of the substrates 1 forming a liquid crystal display, the full reflection layer has some portions removed so as to form light transmission portions 2a and light reflection portions 2b by etching, and color filters 3 are provided on the light transmission portions and the light reflection portions.

When the display is in a dark place, a bright image is obtained by turning on the backlight and using light irradiated through the light transmission portions 2a. When the display is in a light place, a bright image is obtained by external light reflected by the light reflection portions 2b made of the full reflection layer 2.

In the case of utilizing the full reflection layer 2 having the light transmission portions 2a partly formed therein, when the color reproduction properties are set to meet the requirements for the light reflection portions 2b at the time of providing the color filters, the color purity at the light transmission portions 2a degrades because of designing for reflection, which gives importance to brightness. On the other hand, when the color reproduction properties are set to meet the light transmission portions 2a at the time of providing the color filters, the light reflection portions 2b has a darker image because of designing for transmission, which gives importance to color purity.

Although one of the methods to solve this problem is that color filters are differently applied for transmission and reflection, this method needs to have different steps to provide the color filters, which is unfavorable in terms of costs.

There is a proposal wherein each of the color filters 3 is formed to have portions having different thicknesses by providing the full reflection layer 2 with a greater thickness to form a sufficient stepwise difference between a light transmission portion 2a and its adjacent light reflection portion 2b so that the light passing through the color filters 3 has substantially the same path length on either of transmission and reflection to obtain both transmission properties and reflection properties in a good fashion. However, this is not a favorable method since there is a possibility that a problem of peeling is created since stress increases by increasing the thickness of the full reflection layer 2, which is normally around 0.2 µm.

There has been known another method wherein the light passing through the color filters has substantially the same path length on either of transmission and reflection by providing a reflection film on each of projected portions of an indented surface of a light diffusion layer and by forming a hole in each of the recessed portions at the time of providing color filters on the uneven surface. However, this method is not practical since the method needs an extremely precise lithographic technique.

SUMMARY OF THE INVENTION

It is an object of the present invention to provide an economical and practical solution capable of realizing good color purity and brightness on both light transmission and light reflection in a transflective color liquid crystal display wherein a full reflection layer is utilized.

In order to solve the object, according to a first aspect of the present invention, there is provided a transflective color liquid crystal display, wherein one of transparent substrates has an inner surface formed with light reflection portions made of a full reflection layer and light transmission portions formed as openings without the full reflection layer, and wherein a color filter is provided on each paired light reflection portion and light transmission portion, characterized in that the full reflection film has a transparent resist having a thickness provided thereon, and the light transmission portions are formed as holes having a certain depth, whereby the color filters have a greater thickness at the light transmission portions than at the light reflection portions.

In this case, when the color filters have a 2 times greater thickness at the light transmission portions than at the light reflection portions, the path length of light that passes through the color filters on light transmission becomes equal to the path length of light that passes in the color filters on light reflection. However, it is preferable in terms of compatibility of the color purity on light transmission and the brightness on light reflection that the magnification is set at a value from 1.2 to 4.5 times, preferably from 2.2 to 4.5 times.

According to a second aspect of the present invention, there is provided a method for fabricating a substrate for a transflective color liquid crystal display, comprising providing one of substrates with light reflection portions made of a full reflection layer and light transmission portions formed as openings without the full reflection layer, and providing a color filter on each paired light reflection portion and light transmission portion, characterized in that the method further comprises providing a transparent resist made of a photosensitive resin only at the light reflection portions by a lithographic technique and firing the transparent resin before provision of the color filter on each paired light reflection portion and light transmission portion.

In accordance with the method of the present invention, the transparent resist, which is provided on the light reflection portions and made of a photosensitive resist, can be utilized as a stepwise arrangement in order that the color filters have a greater thickness at the light transmission portions than at the light reflection portions. As a result, different color filters do not need to be applied at the light transmission portions and the light reflection portions, reducing loads in the designing process and the fabricating process.

DETAILED DESCRIPTION OF THE INVENTION

Figure 1:
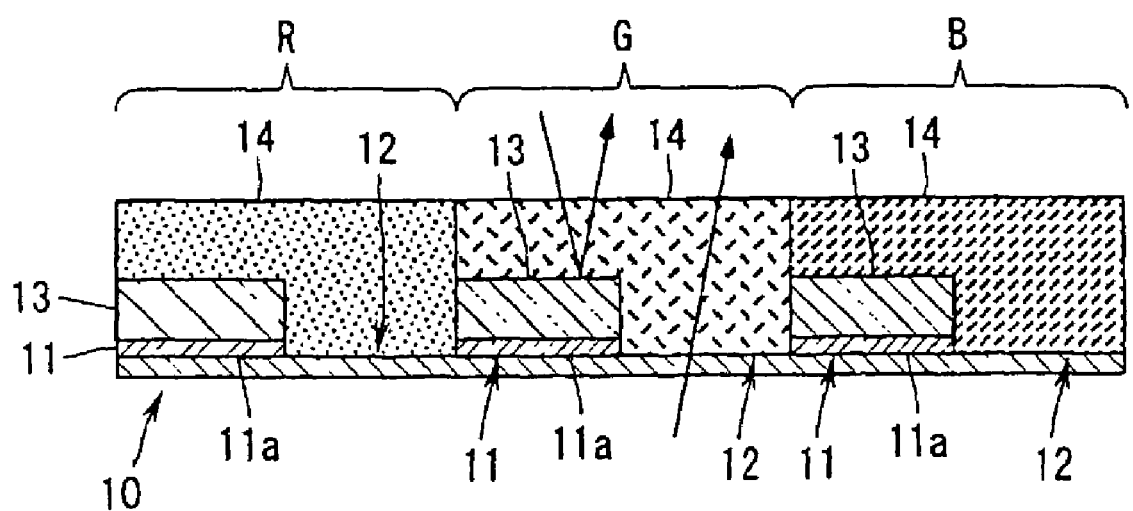
FIG. 1 is an enlarged cross-sectional view showing the essential parts of an embodiment of a rear side substrate, which is included in the transflective color liquid crystal display according to the present invention.

In general, a liquid crystal display basically includes a pair of transparent substrates, i.e., a substrate on a viewer side and a substrate on a rear side (a side opposite to the viewer side). For explanation of an embodiment according to the present invention, an arrangement of three pixels (R, G and B) of the substrate 10 on the rear side, which is used as one of the substrates, is shown in enlargement in FIG. 1. In explanation of the present invention, the substrate on the viewer side as the other substrate is not shown in the accompanying drawings since the viewer side substrate includes no characteristic elements.

The rear side substrate 10 may be a glass or plastic substrate. The rear side substrate has an inner surface (a surface facing the unshown viewer side substrate) provided with the respective pixels, each of which includes a light reflection portion 11 made of a full reflection layer 11a and a light transmission portion 12 as an opening formed by removing a portion of the full reflection layer by, e.g., etching.

Each light reflection portion 11 has a transparent resist 13 formed on the full reflection layer 11a so as to have a certain thickness. The transparent resist 13 has a much greater thickness than the full reflection layer 11a, thereby providing the light transmission portion 12 with a hole having a length substantially equal to the thickness of the transparent resist 13.

Although the light reflection portion 11 and the light transmission portion 12 have a color filter 14 with a flat and smooth surface in each of the pixels of R, G and B, the color filter 14 has a smaller thickness at the light reflection portion 11 and a greater thickness at the light transmission portion 12 since the light reflection portion 11 has the transparent resist 13 formed thereon.

Incoming ambient external light is reflected by each light reflection portion 11, and light that is irradiated from an unshown backlight passes through each light transmission portion 12. In that case, the reflected light contributes to produce a bright image since each color filter 14 is thin at the reflection portion. Additionally, the transmission light contributes to produce an image with good color purity since each color filter 14 is thick at the transmission portion.

In order that the brightness on light reflection and the color purity on light transmission are compatible, it is preferable that the transparent resist 13 has a thickness set so that the thickness of the color filter 14 at the light transmission portions 12 is 1.2 times to 4.5 times the thickness of the color filter 14 at the light reflection portions 11.

Figure 2:
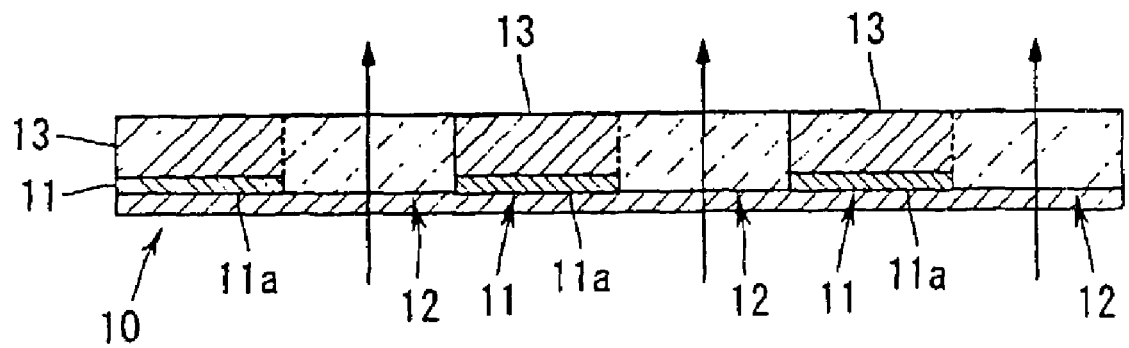
FIG. 2 is an enlarged cross-sectional view of the essential parts to explain a method for fabricating the rear side substrate.
Figure 3:
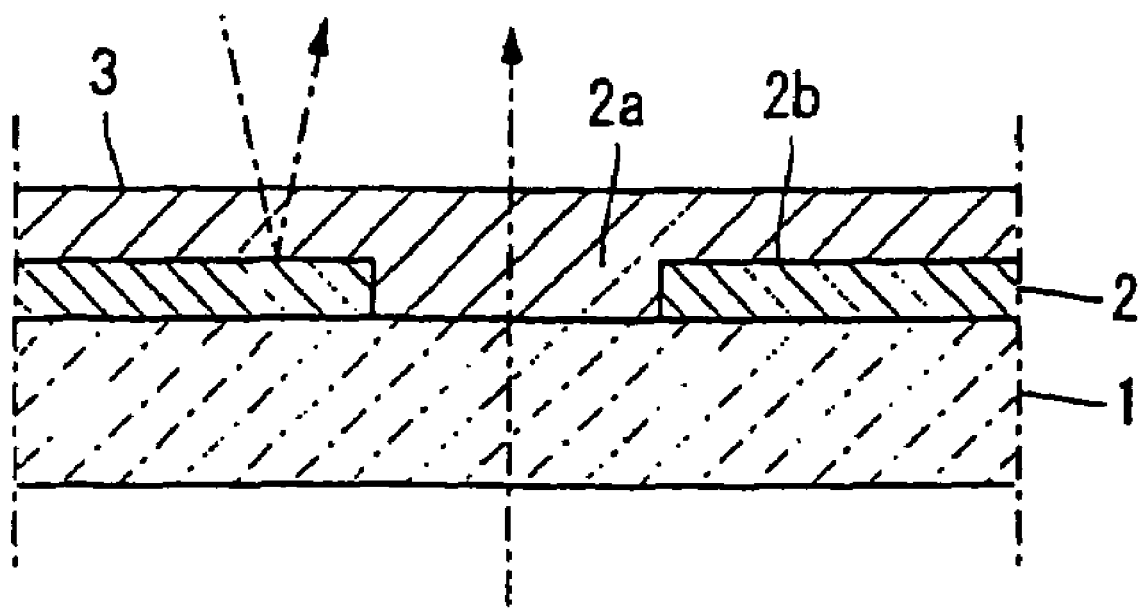
FIG. 3 is a cross-sectional view showing the arrangement of a conventional color filter.

Now, referring to FIG. 2, a preferable method for fabricating the rear side substrate 10 will be described. A transparent substrate, which is made of, e.g., glass, has a full reflection layer 11a deposited on one side working as the inner surface, the transparent substrate with the full reflection layer deposited thereon has a photoresist applied thereon, the photoresist is exposed through a photomask having a pattern for forming light transmission portions, and the exposed photoresist is developed to expose desired portions of the full reflection layer. After the portions of the full reflection layer 11a to work as the light transmission portions are removed by etching, the unnecessary photoresist is removed.

Figure 4:
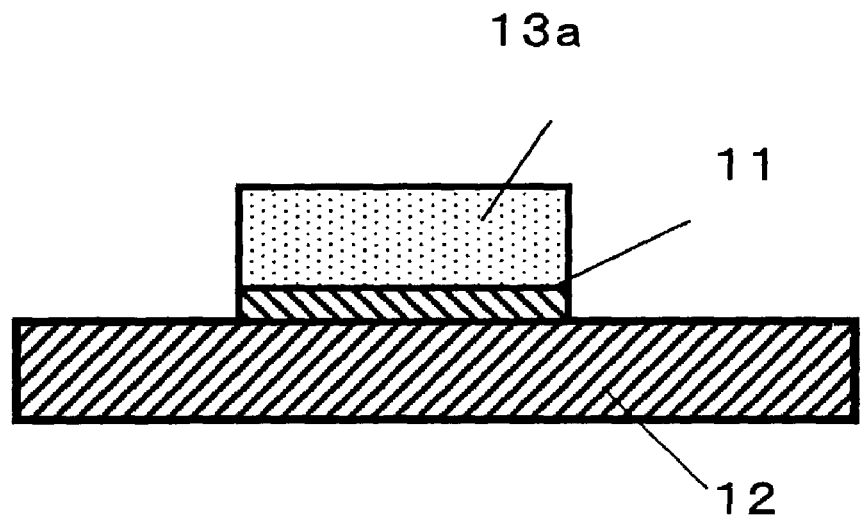
FIG. 4 is a cross-sectional view showing the step in which a photosensitive resin 13a is disposed.

After the transparent substrate has had the light reflection portions 11 and the light transmission portions 12 formed thereon in that manner, the transparent substrate has a transparent positive photosensitive resin 13a applied at a certain thickness so as to have a flat surface (see FIG. 4). The resin is exposed and developed from the other side (rear side) of the substrate, using the full reflection film 11a at each of the light reflection portions as a photomask.

Figure 5:
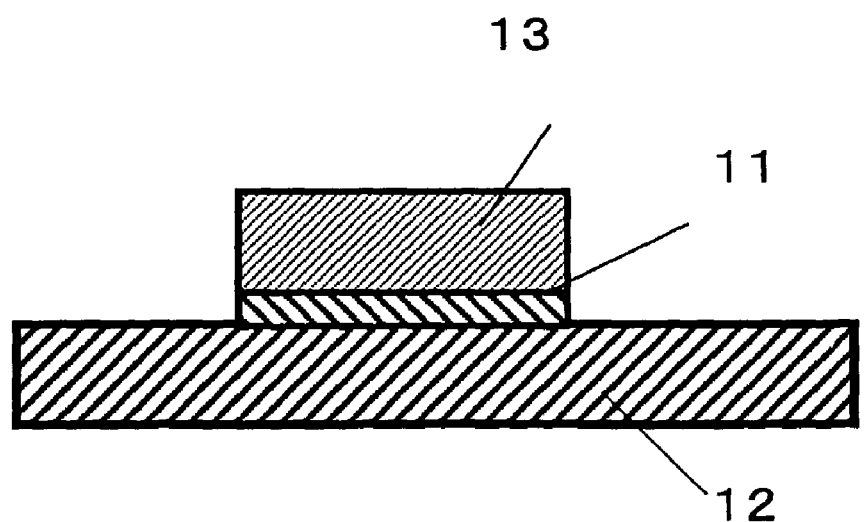
FIG. 5 is a cross-sectional view showing the step in which a transparent resist 13 is made by baking.

Since the exposed portions of the positive photosensitive resin are dissolvent, the resin at the light transmission portions 12 is removed by the developing step. The remaining positive photosensitive resin 13a is baked to form the transparent resist 13 at each of the light reflection portions (see FIG. 5). After that, a color filter 14 is provided on each paired light reflection portion 11 and light transmission portion 12 in each pixel. Thus, in accordance with the method of the present invention, it is possible to form the transparent resist 13 without using a photomask.

Although the photoresist used for patterning the full reflection layer is once removed to avoid an adverse effect given by the patterning step in the embodiment stated earlier, the photoresist used for this patterning step may be utilized as the transparent photoresist 13 for forming a stepwise arrangement without being removed. In the latter case, the process is further simplified.

Although not shown, the rear side substrate 10 preferably has a smoothed layer formed on the color filters 14 prior to provision of transparent electrodes and an alignment layer. The other substrate as the viewer side substrate also has transparent electrodes and an alignment layer provided on an inner surface, the rear side substrate 10 and the viewer side substrate are press-fitted each other through an edge sealant, and the cell gap thus formed has a liquid crystal, such as TN and STN, sealed therein, providing a transflective color liquid crystal display.

EXAMPLE

A full reflection mirror (full reflection film) was deposited on glass substrates, a photoresist was applied on the glass substrates for mirror patterning, the photoresist was exposed and developed so as to provide targeted portions with light transmission portions, the Ag mirror at the light transmission portions was removed by etching, and the unnecessary photoresist was removed.

After the light transmission portions were partly provided in the full reflection mirror of each of the glass substrates as stated earlier, a positive photosensitive resist manufactured under the name of PC403 by JSR Corporation as the transparent positive photosensitive resin was applied on the glass substrates at different thicknesses. The resist was wholly exposed from the rear side of each of the substrates, using the mirrors left at the light reflection portions as photomasks. The substrates were prepared so as to have the light transmission portions formed with holes having a depth 1.0 μm, a depth of 2.0 μm and a depth of 3.0 μm, respectively, by developing the resist.

Then, color filter materials (commercially available under the names of PERR0402, REGG0402 and REBB0402 by Mitsubishi Chemical Corporation) were applied to the respective substrates, preparing color filters, the thicknesses of which are all set at 1.0 µm at the light reflection portions, and the thicknesses of which are respectively set at 1.2 µm, 2.0 µm, 3.0 µm and 4.0 µm at the light transmission portions.

After that, smoothed layers, transparent row electrodes and alignment layers were provided in this order as in an ordinary liquid crystal display, and paired substrates with the transparent column electrodes and the alignment layers were press-fitted each other through edge sealants, fabricating transflective color liquid crystal displays.

The light transmission portion of the each color filter is 30 µm×270 µm size, which is correspond to 90 µm width column electrode and 270 µm width row electrode line of passive matrix display.

In each of the displays, the area of the color gamut at the light reflection portions is calculated as 30. As the thickness increases, the area of the color gamut is calculated as increasing to 14, 30, 50 and 67, and the transmission rate is calculated as lowering to 58%, 48%, 41% and 36%.

As explained above, in accordance with the present invention, it is possible to realize good color purity and brightness on both light transmission and light reflection by providing the transparent resist having a certain thickness on the full reflection layer at the light reflection portions and forming the light transmission portions as the holes having a certain length in order to provide the color filters with different thicknesses at the light reflection portions and the light transmission portions, when one of the substrates has the inner surface provided with the light reflection portions made of the full reflection layer and the light transmission portions formed as openings without the full reflection layer, and each color filter is provided on each paired light reflection portion and light transmission portion.

The entire disclosure of Japanese Patent Application No. 2001-335206 filed on Oct. 31, 2001 including specification, claims, drawings and summary is incorporated herein by reference in its entirety.

The invention claimed is:

1. A transflective color liquid crystal display comprising:
   a transparent substrate having an inner surface; and
   first, second and third color filter elements arranged in a row, disposed on the inner surface, each forming a full reflection portion and a light transmission portion, each of the color filter elements including,
      a respective color filter,
      a transparent photoresist, and
      a reflection layer,
   wherein each color filter has a portion disposed on the transparent photoresist and on the respective reflection layer to form the full reflection portion, and another portion of the color filter is disposed on the respective transparent substrate to form the light transmission portion, such that a first light reflected by the reflection layer is transmitted through the transparent photoresist and the color filter in the full reflection portion, and such that a second light is transmitted through the light transmission portion, and
   wherein a color filter at the light transmission portion has a thickness 2.2 to 4.5 times a thickness of a color filter at the full reflection portion.

2. The liquid crystal display according to claim 1, further comprising:
   an upper substrate; and
   a TN liquid crystal layer arranged between the transparent and upper substrates.

3. The liquid crystal display according to claim 1, further comprising:
   an upper substrate; and
   an STN liquid crystal layer arranged between the transparent substrate and the upper substrate.

4. The liquid crystal display according to claim 1, wherein the color filter elements comprise a red filter, a blue filter, and a green filter.

5. The liquid crystal display according to claim 1, wherein the first color filter element comprises one of a red filter, a blue filter, and a green filter.

6. The liquid crystal display according to claim 1, wherein at least one of said color filter elements comprises a rectangle in a substrate plane.

7. The liquid crystal display according to claim 1, wherein said reflection layers comprise Ag.

8. The liquid crystal display according to claim 1, wherein the color filters contact one another.

9. The liquid crystal display according to claim 8, wherein the first, second, and third color filter elements each comprise a different one of a red filter, a blue filter, and a green filter.

10. The transflective color liquid crystal display according to claim 1,
    wherein the full reflection portion of the second color filter element is disposed adjacent the first color filter element, and the transmission portion of the second color filter element is disposed adjacent the third color filter element.

11. The liquid crystal display according to claim 10, wherein the full reflection portion of the second color filter element contacts the light transmission portion of the third color filter element, and the light transmission portion of the second color filter element contacts the full reflection portion of the first color filter element.

12. The liquid crystal display according to claim 1, wherein the full reflection portions and the light transmission portions of adjacent filter elements are arranged next to each other.

13. The liquid crystal display according to claim 1, wherein the first light and the second light having a substantially similar color gamut and which are able to be seen at a same time.

14. A transflective color liquid crystal display comprising:
    a transparent substrate having an inner surface; and
    first, second and third color filter elements disposed on the inner surface, each forming full reflection portions and light transmission portions, each of the filter elements including,
       a respective color filter,
       a transparent photoresist, and
       a reflection layer,
    wherein each color filter has a portion disposed on the respective transparent photoresist and the respective reflection layer to form the full reflection portion, and another portion of the color filter is disposed on the respective transparent substrate to form the light transmission portion, such that a light reflected by the reflection layer is transmitted through the transparent photoresist and the portion of the color filter in the light reflection portion,
    wherein a color filter at the light transmission portion has a thickness 2.2 to 4.5 times a thickness of a color filter at the full reflection portion.

* * * * *